Jan. 27, 1931.　　　　　E. A. JAEN　　　　　1,790,475
AUTOMOBILE HEADLIGHT CONTROL
Filed July 18, 1927　　　3 Sheets-Sheet 1
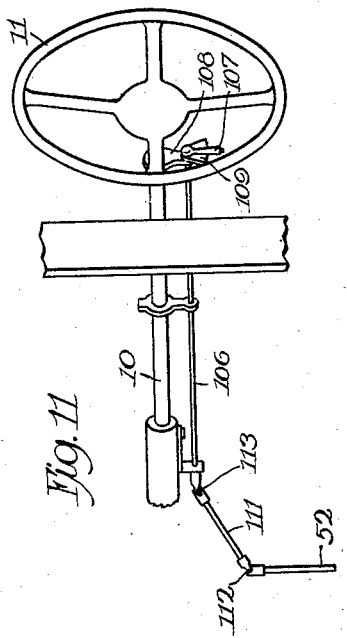
Fig. 11
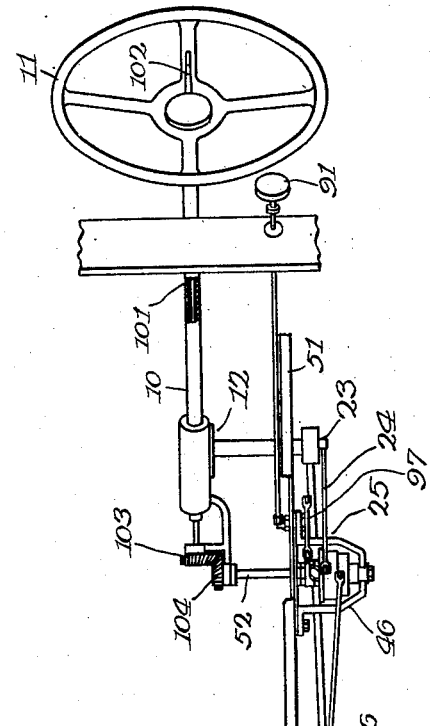
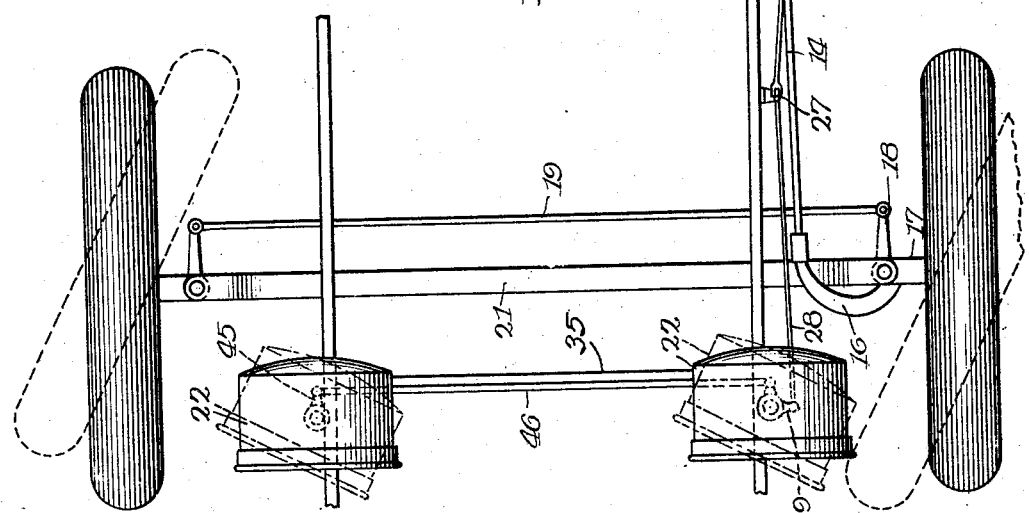
Fig. 1
Inventor
Elpidio Ambrioso Jaen
By George E. Mueller
Atty.

Jan. 27, 1931.  E. A. JAEN  1,790,475
AUTOMOBILE HEADLIGHT CONTROL
Filed July 18, 1927  3 Sheets-Sheet 2
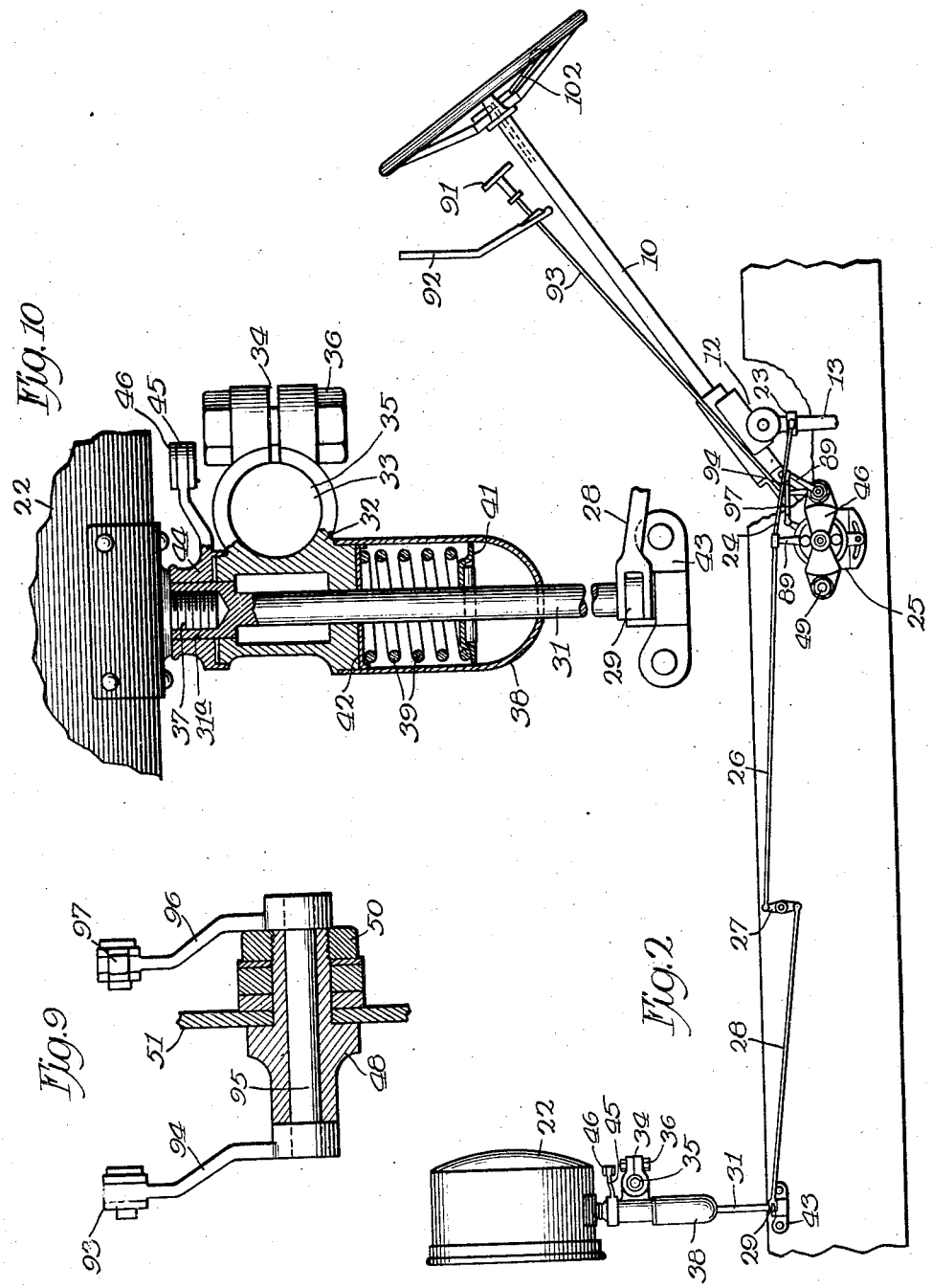
Inventor
Elpidio Ambrioso Jaen
By George E. Mueller Atty.

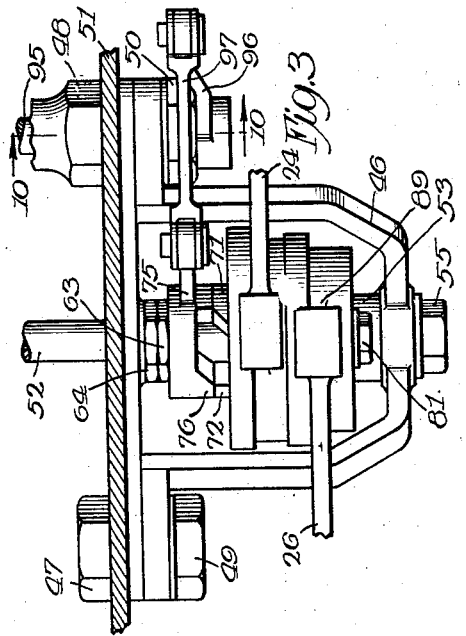

Patented Jan. 27, 1931

1,790,475

UNITED STATES PATENT OFFICE

ELPIDIO AMBRIOSO JAEN, OF CHICAGO, ILLINOIS

AUTOMOBILE HEADLIGHT CONTROL

Application filed July 18, 1927. Serial No. 206,469.

My invention relates in general to automobile road lighting and more particularly to an improved mechanism for controlling the inclination of the headlights from the driver's seat.

One of the principal objects of my invention is to improve the means employed at night for illuminating the road ahead of an automobile.

Another object is to light the portion of a road over which an automobile will travel.

Another object is to fix the lights in the same direction as the front wheels thereof.

Another object is to provide a mechanism for controlling the direction of a headlight beam either automatically or manually as desired.

The details of the invention will be manifest from a consideration of the subsequent description of one embodiment thereof and from a study of the accompanying drawings wherein—

Fig. 1 is a schematic representation in plan of the application of my invention to an automobile;

Fig. 2 is a fragmentary side elevational view of the mechanism shown in Fig. 1;

Fig. 3 is a plan view of a clutch mechanism for disengaging the headlights from the steering mechanism;

Fig. 4 is an elevational view of said clutch;

Fig. 5 is a longitudinal sectional view through the clutch with the parts in the position they assume when the headlights are automatically controlled by the steering mechanism;

Fig. 6 is a longitudinal section partly in elevation showing the clutch members disengaged;

Fig. 7 is a perspective view of one of the cam members for controlling the clutch;

Fig. 8 is a perspective view of the complemental cam bearing member;

Fig. 9 is a sectional view through a portion of the mechanism for controlling the clutch, the section is such as would be taken along the line 9—9 of Fig. 3;

Fig. 10 is a vertical section through the headlight mounting; and

Fig. 11 is a modification of the means for disconnecting the headlights from automatic control by the steering mechanism.

In a simplified form of my invention, I mount the headlights on vertical spindles so they are free to move thereon. A tie rod connecting the headlights assures their acting in unison, and a rod connection between the steering arm and an arm on the headlight assembly causes the lights to be inclined in the same direction as the front wheels when the steering gear is turned.

In a refinement of the invention, I insert a clutch mechanism between the steering means and the headlights so that the connection therebetween may be broken. A separate control shaft running to a convenient position adjacent the driver's seat permits the headlights to be controlled manually independent of the direction of the car. The clutch is engaged or disengaged from the driver's seat through an operating rod provided for the purpose. Means are also provided for assuring that the clutch will engage in only one position, so that the headlights will always be lined up true with the wheels when the clutch is in engagement.

The specific mechanism for carrying out my invention, may appear in a variety of forms but one arrangement thereof which has appeared quite successful and which is shown in the drawings will now be described.

The drawings indicate several usual parts of an automobile which must be shown to explain the headlight arrangement. The usual steering column 10 has a steering wheel 11 at the top thereof which controls through a suitable gear mechanism 12, the throw of a steering arm 13. This arm is connected to a drag link 14 for carrying the motion of the steering arm to a knuckle thrust arm 16. Knuckle thrust arm 16 is integral with steering knuckle 17 and the steering knuckle 18 connected to a tie rod 19 for conveying the movement of one wheel to that of the other. The steering knuckles of the two wheels are secured by knuckle pins to the usual front axle 21.

The headlights 22 are mounted to turn with the wheels in a manner to be described, and they are controlled either full automatically or by hand as desired. A clamp 23 is secured around the steering arm and has a clamp arm 24 connecting to a clutch mechanism designated generally by the reference character 25, for conveying the motion of the steering lever to the clutch mechanism. A connecting rod 26 from the clutch mechanism is connected to one end of a rocker arm 27, the other end of the rocker being connected to a rod 28 engaging with a spindle arm 29 on a spindle 31 connected to the left headlight casing.

The left headlight assembly besides the spindle 31, includes a bracket 32 having a band portion 33 and split at 34 so that the band may be secured around a transverse frame member 35 and secured tightly thereon by a suitable nut and bolt 36. The upper part of the spindle has an enlarged portion 31a recessed and threaded to receive a threaded stud 37 which is a part of the headlight casing and supports the same. The bracket 34 is shaped to receive the upper open end of a casing 38 which surrounds a coil spring 39 on the spindle. A spring stop 41 is pinned to the spindle and bears against one end of the spring while the other end of the spring bears against a plate 42 on the bottom of the bracket. The lower end of the spindle extends into a guide piece 43 which is secured in any suitable manner to the body of the automobile. At the upper part of the spindle, a lever arm body 44 is pinned or otherwise secured to the enlarged portion 31a and has a lever 45 connected with a tie-rod 46 for transmitting the motion of the left headlight spindle to the opposite or right hand headlight assembly. The right hand headlight assembly is of course similar in construction to the left hand assembly indicated in Fig. 9 except that the spindle is not required to extend substantially below the casing, and the motion instead of being received directly by the spindle is received by a lever 45′ (Fig. 1), which is of course the equivalent in construction of the lever 45 shown in Fig. 9.

In its simplest form, my invention contemplates a direct rod connection between the clamp 23 on the steering lever and the rocker arm 27 so that a direct movement of the headlights is obtained without the intervention of the clutch 25. This clutch however, is a refinement which is of undoubted advantage and which will permit the automatic connection of the headlight operation to be discontinued at the will of the driver and controlled from his seat, so that the headlights may be caused to shine directly ahead at all times independent of the motion of the wheels, or be inclined at the will of the driver manually from one side to the other.

The details of the clutch are shown in Figs. 3 to 9 inclusive.

The clutch comprises a main frame member 46 secured by bolts 47 and 48 and nuts 49 and 50 to a portion of the chassis 51. A central shaft 52 has a driven clutch member 53 secured thereon by a pin 54 and a nut 55 threaded and pinned on the end of the shaft, supports a collar 56 in abutting relation with the driven clutch member 53. The collar not only serves as a spacer but may support lubricating means such as an oil cup (not shown). At the opposite side of the clutch, a stationary bracket 57 is provided with lateral extensions which are included with the frame member 46 in engagement by the nuts and bolts supporting the clutch on the chassis. The bracket 57 is therefore stationary and the shaft 52 is journaled therein. A depending portion 58 is provided with an arcuate support 59 which is adapted to receive a threaded pin 61 held therein by a nut 62. An intermediate thread on the shaft is provided with a nut 63 anchored by a lock nut 64 the purpose of which will be hereinafter explained.

Adjacent the driven clutch member 53 and in abutting relation therewith, is a complemental clutch member 65 journaled and freely moving with respect to the shaft 52. A coil spring 66 is disposed between the two clutch members normally forcing them apart. They are brought together to accomplish their function in a manner and through mechanism which will now be described.

A stationary cam member 67 is journaled on the shaft but is prevented from turning thereon because the pin 61 engages in an aperture 68 in a depending tail thereof and holds it stationary. This cam member is provided with a pair of cams 71 and 72 having inclined planes 71a and 72a respectively. Adjacent the stationary cam member is a movable cam member 74 with an upwardly projecting arm 75 and this cam member has a pair of cams 76 and 77 with inclined surfaces 76a and 77a adapted to cooperate with the inclined surfaces on the cams of the other cam member.

The cams are arranged so that they will fit into each other and the cams on one cam member project and fit snugly into the space between the two cams in the opposing cam member. With the movement of the arm 75 member, the inclined surfaces may be made to oppose each other so that the cam members will be forced apart and the flat opposed surfaces of the cams overlie each other. In this position the clutch is engaged, the engagement being effected through a suitable mechanism which I will now point out.

The driven clutch member is provided with a pair of apertures circular in form but of unequal cross section throughout their length. The outer end is threaded to receive a pair of short open ended cap screws 81—81 into the open inner end of which springs 82 and 83 project. The other ends of the springs engage connecting pins 84 which are provided with heads 84a to furnish a seat for the springs and means for arresting forward motion thereof in suitably provided shoulders in the clutch member. There is a pair of openings in the clutch member 65 adapted to receive the pins when the clutch members are together and in proper alignment.

The two clutch members are in overlapping alignment and an annular recess 85 in the clutch member 65 is adapted to receive a washer of felt or the like to prevent the entrance of dust into the clutch. Similarly a recess in the cam member 67 has a recess to prevent the entrance of dust or foreign matter between the cam members and adjacent the clutch member.

When the clutch is engaged, the rod 24 engages an arm 88 on the clutch member 65 and moves this clutch member about the shaft 52 as the pivot. The pins 84 being in a position to engage the two clutch members, the driven clutch member 53 will also be moved. This clutch member has an arm 89 in engagement with the rod 26, so that the movement is carried straight through to the headlights through the mechanism previously described.

To disconnect the clutch so that the movement of the wheel does not control the headlights automatically, I provide a hand-piece 91 secured on the upper end of a rod 93 projecting through a portion of the dash 92. The rod 93 connects with an arm 94 which is pinned on a small shaft 95 journaled in the bolt 48 which is made hollow for the purpose. The other end of this shaft has an arm 96 connected by a link 97 to the arm 75. By pulling the hand piece 91 upwardly, the cam member 74 through its arm 75 is made to revolve about the shaft 56 in a counter clockwise direction. This forces the cam member 67 outwardly and brings the clutch member 65 against the action of spring 66 into closer relationship with the clutch member 53. The reverse action, namely pushing the hand piece 91 downwardly, will have the opposite effect i. e. disconnect the clutch.

The headlights may be controlled by hand when the clutch is disengaged, by providing a controlling handle at a place convenient to the driver's seat. In the main embodiment of the invention, a rod 101 is brought up through the steering column and has an operating handle 102 secured at the upper end thereof, with a bevel gear segment 103 secured at the other end thereof. The segment 103 meshes with another segment 104 which is secured on the end of the clutch shaft 52.

In a modified form of the invention, a shaft 106 is secured in suitable brackets so as to project through the dash board parallel to the steering column. A handle 107 just below the steering wheel, is pinned to the top of the shaft and an upper bracket 108 encircling the steering column has a guide segment 109 in contact with a suitably provided detent (not shown) on the handle 107. At the bottom of the shaft 106 is provided a connecting link 111 secured between the clutch shaft 52 and the shaft 106 by universal joints 112 and 113.

In operating the mechanism, the lights can be made to move with the wheels automatically or not as desired by the driver. Assuming that it is dark and the driver is on a road which is somewhat winding, he will pull upwardly on the hand-piece 91, to engage the clutch 25 and operate the lights automatically with the steering gear. When the hand piece is pulled up, the rod 93 through arms 94 and 96 and link 97 causes a rotation of the cam member 74 in a counter clockwise direction. This causes its cams to ride up on the cams of the stationary cam member 67. This member of course is kept from turning by its engagement with the pin 61. It is however able to travel bodily along the shaft 52 which it does, forcing the clutch member 65 to the left (Figs. 5 and 6). The forcing of the clutch member 65 toward the member 53, tensions the clutch spring 66, and if the pins 84 are in registration with the apertures in the clutch member 65, these pins will enter the opposing clutch member and effect a driving engagement. At this point, movement of the clutch member 65 through the rod 24 and arm 88 will cause a corresponding movement of the clutch member 63 so as to operate the rod 26. If the pins are not in registration with the apertures in the opposing clutch member, the springs 82 and 83 will be compressed so that the ends of the pins will ride against the smooth face of the clutch member 65. Now however, if the steering wheel is turned, the clutch member 65 will move with it until such time as the apertures thereon register with the pins, whereupon, the pins compressed by their respective springs will plunge into the apertures and effect a driving engagement between the two clutch members.

Inasmuch as most driving will be done in an automobile in the daytime, or when driving at night probably along a fairly straight road, I make the normal position of my mechanism such that the clutch is out of engagement. Accordingly when the hand piece 91 is pushed down against the dash board, the clutch is out of engagement. When this action takes place, the movement of the cams is direct, but the clutch members are separated through the action of the spring 66. The members can be declutched with the lights in any position, but if they should be out of line after disengagement, they can be trued by operating the hand lever 102 or 107 as the case may be. I anticipate providing suitable markings so that the "neutral" position of the lights can always be determined from the position of the hand lever.

The tension of the springs 82 and 83 can be regulated or old springs can be replaced by removing the screws 81. Wear on the pins can also be taken care of in the same manner by replacement. The adjustment for the cams is through the pin 61, this pin being movable in the arcuate slot 50 so that the stationary position of the cam member 67 can be determined thereby.

What I claim as new and desire to secure by United States Letters Patent is:

1. In an automobile the combination with a steering mechanism for adjusting the front wheels, and dirigible head lights operable by the steering mechanism of a clutch in the form of two clutch members with a spring pressed connecting means carried by one of the clutch members for engaging between the two members, a single engaging position on the other clutch so that an engagement between the members can be had in only a single predetermined position so that said lights and wheels are automatically aligned when the clutch is engaged.

2. In an automobile, the combination with a steering mechanism for adjusting the front wheels and dirigible headlights operable by the steering mechanism, of a clutch for controlling the connection between the steering mechanism and said headlights, means for aligning the lights and wheels when said clutch is engaged, and a pair of cam members associated with the clutch and a connection from one of the cam members to the driver's seat for moving the same for controlling the engagement of the clutch.

3. In an automobile, the combination with a steering mechanism for adjusting the front wheels and dirigible headlights operable by the steering mechanism, of a clutch having a central shaft, a clutch member secured to the shaft and connected to the headlights to move the same, a second clutch member journaled on the shaft and having a connection to the steering mechanism, means controllable from the driver's seat for controlling the engagement of said clutch members, said means for controlling said clutch members including a spring interposed between said clutch members, a pair of cams with inclined deposed faces journaled on the shaft, and means whereby one of said cam members may be rotated while the other is held in stationary position so that the stationary cam will force the clutch member against its spring into engagement with the opposing clutch member.

4. A clutch for the purpose described including a central shaft, a clutch member secured thereon and having an arm adapted to form a connection with the headlights, a second clutch member journaled on the shaft and having an arm for engagement with the steering mechanism, a spring interposed between the two clutch members and normally tending to force them out of engagement, a relatively stationary cam member abutting said second clutch member, and a second cam member opposing said stationary cam, with an arm for making a connection to the driver's seat so that movement of said second cam will force the stationary cam and second clutch member against the action of the spring interposed between the clutch members to effect a clutch connection.

5. The clutch defined in claim 4 wherein said first clutch member is provided with a pair of spring pressed plungers and said second clutch member is provided with a pair of apertures to receive said plungers so that said clutch may be operated with the clutch member in any position but actual engagement will take place only in one position.

6. A clutch for the purpose described including a central shaft, a clutch member secured thereon and having an arm adapted to form a connection with the headlights, a second clutch member journaled on the shaft and having an arm for engagement with the steering mechanism, and spring pressed engaging means between the clutch members adapted for engagement in only one position whereby the clutch members can be actuated independent of the position thereof, and will become engaged when such clutch members reach the predetermined position of said spring pressed engaging means.

7. In a clutch for the purpose described adapted for connection to a steering gear and designed to incline automobile headlights with the movement of the wheels, said clutch including a central rotatable shaft, a pair of clutch members carried by the shaft, one a driven member pinned to the shaft and the other a driving member journaled on the shaft, a connection from the driving clutch member to the steering gear, means located near a driver's seat for connecting or disconnecting said clutch members so that the movement of the driving clutch member as imparted thereto by the steering gear may be caused to move said driven clutch member, a connection from the driven clutch member to the headlights, and separate means located in the driver's seat for turning said central clutch shaft so that the driven clutch member pinned to such shaft may be moved independent of the movement of the steering gear.

8. The combination described in claim 7 wherein a spring is interposed between said clutch members, with a pair of cam members journaled on the central shaft, one of said cam members adapted to be held in a stationary position and the other cam member freely movable, the connection at the driver's seat being to the movable cam member whereby the driving clutch member may be forced against the interposed spring into engagement with the driven clutch members.

9. The combination set out in claim 7 wherein an aperture is provided in one clutch member and a spring pressed plunger carried by the other clutch member is adapted for insertion in said aperture whereby connection is made between the clutch members, and whereby the clutch engaging means is operable at any time and in any position and the plungers engage in the aperture only in such a position as to automatically align the lights and wheels.

In witness whereof, I hereunto subscribe my name this 18th day of June, 1927.

ELPIDIO AMBRIOSO JAEN.